United States Patent [19]

Lichtenstein et al.

[11] 4,169,552

[45] Oct. 2, 1979

[54] ADJUSTABLE AUTOMOTIVE AND AIRCRAFT SUN VISOR EXTENSION

[76] Inventors: Arthur L. Lichtenstein, 4548 N. Meridan Ave., Fresno, Calif. 93726; Vincent Petruzzi, 1124 Cedar St., San Carlos, Calif. 94070; Michael P. Anderson, 1162 Cardoza, Tulane, Calif. 93274

[21] Appl. No.: 887,419

[22] Filed: Mar. 16, 1978

[51] Int. Cl.² .............................................. B60J 3/02
[52] U.S. Cl. .................................. 296/97 C; 296/97 G
[58] Field of Search ................ 296/97 G, 97 H, 97 C

[56] References Cited

U.S. PATENT DOCUMENTS

| 2,201,197 | 5/1940 | Minor, Jr. ........................ 296/97 C |
| 2,667,222 | 1/1954 | McCarthy et al. ............... 296/97 C |
| 3,649,068 | 3/1972 | Moynihan ........................ 296/97 C |
| 3,880,461 | 4/1975 | Flanagan ......................... 296/97 C |

*Primary Examiner*—Richard A. Bertsch
*Attorney, Agent, or Firm*—William C. Babcock

[57] ABSTRACT

An elongate opaque shield that may be transversely adjusted to encircle a sun visor of an automotive or air borne vehicle, and the shield when so mounted capable of being longitudinally adjusted on the sun visor to serve as an extension thereof in blocking out sun rays to an occupant of the vehicle. The shield is preferably of substantially the same length as the sun visor. When the shield is not in use, it is longitudinally moved to a first position on the sun visor when the ends of the sun visor and shield are substantially transversely aligned, and the shield then being inconspicuous. The shield is capable of being used on automotive vehicles, sun visors of both the single support and dual support type.

2 Claims, 6 Drawing Figures

U.S. Patent  Oct. 2, 1979  4,169,552
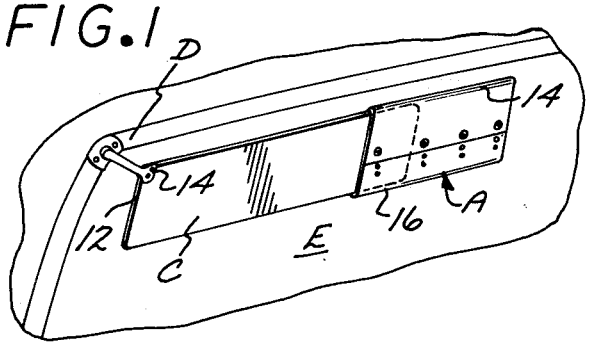
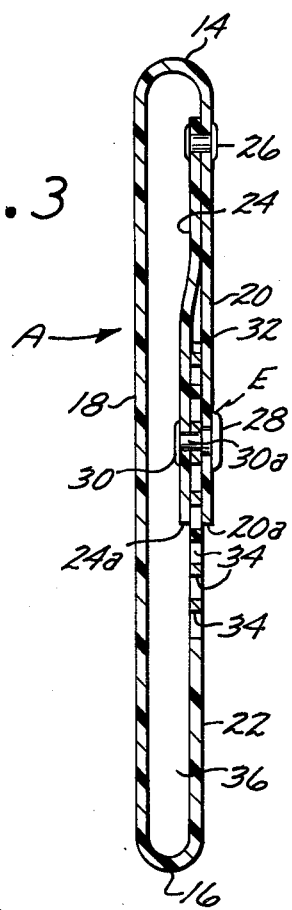
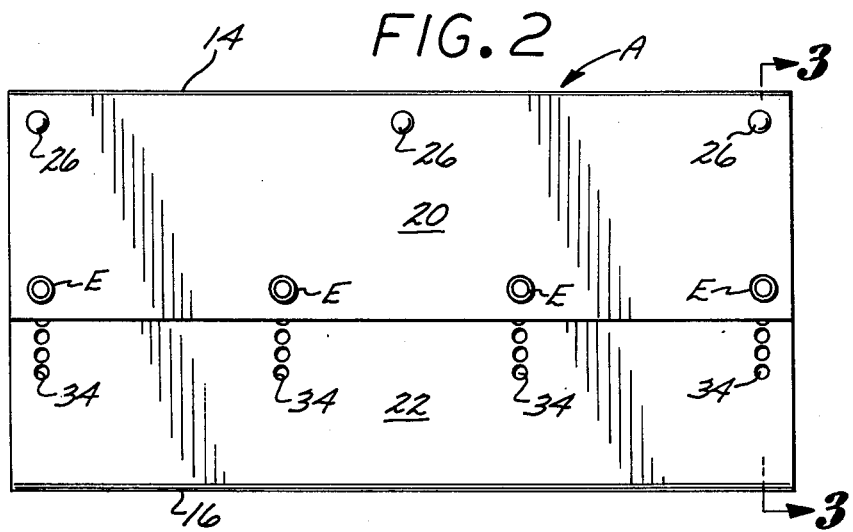
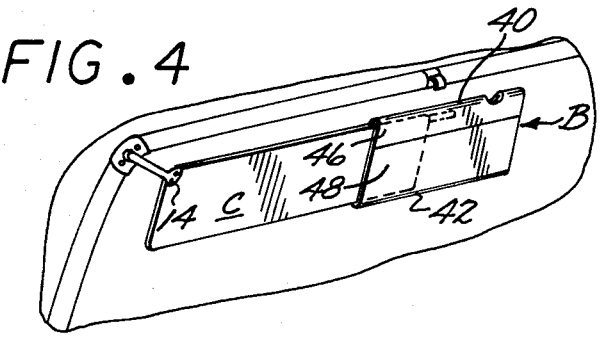
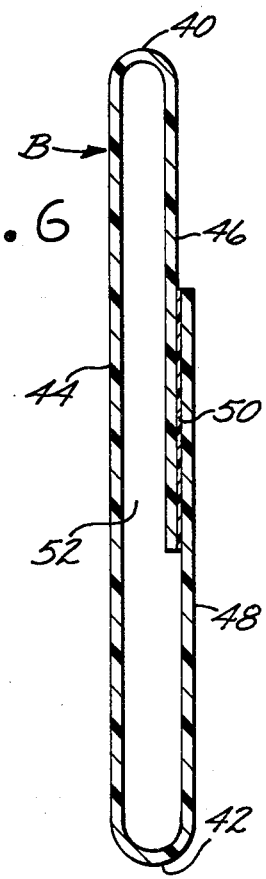
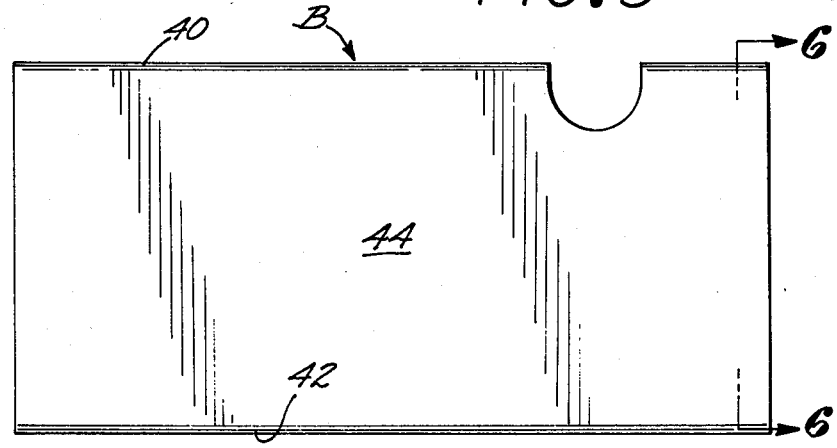

ADJUSTABLE AUTOMOTIVE AND AIRCRAFT SUN VISOR EXTENSION

BACKGROUND OF THE INVENTION

1. Field of the Invention

Adjustable Automotive and Aircraft Sun Visor Extension.

2. Description of the Prior Art

In modern day automotive and aircraft vehicles, pairs of pivotally supported sun visors are normally provided for use by the driver or pilot and the passenger in the seat adjacent the driver or pilot. Such a pair of visors are separated from one another in a vehicle by a space of substantial length through which rays of light from the sun may shine when the rays are at a substantial angle relative to the longitudinal axis of the vehicle. Also, when the visor is pivoted to a rearwardly extending position adjacent a window in an automotive vehicle, the visor may not be sufficiently long as to block out undesirable rays of light from the exterior.

A major object of the present invention is to provide an elongate opaque extension that is movably supported for longitudinal adjustment on the sun visor, and in effect provides an extension of a desired length to block out undesirable light rays for occupants in the front seat of an automotive vehicle.

Another object of the invention is to supply an adjustable sun visor extension that may be made from an opaque sheet or sun ray filtering material that has a desired decorative appearance, with the extension when not in use capable of being slid to a position where it completely envelops the sun visor, and the extension being relatively inconspicuous when so disposed.

Yet another object of the invention is to furnish an adjustable sun visor extension that may be made from a relatively inexpensive sheet material, is light in weight, is compact and occupies a minimum of space when not in use, and is easily and simply mountable on an automotive or aircraft sun visor.

SUMMARY OF THE INVENTION

A sheet of bendable material has two spaced parallel fold lines formed therein that cooperate to subdivide the sheet into a forward panel, a downwardly extending, rearwardly disposed first flap, and an upwardly extending rearwardly disposed flap that constitutes an extension for an automotive or aircraft sun visor when mounted in a projecting portion on the latter. The first flap is of sufficient width as to overlie the upwardly extending flap. A second downwardly extending flap is secured to the upper forward surface of the first flap. The first and second flaps define a space therebetween in which the upper portion of the upwardly extending flap may be removably inserted. Fastening means are provided on the first and second flaps that cooperate with the upwardly extending flap to hold the panel and flaps in the form of a flat hollow sleeve of a desired width that may be removably supported on an automotive or aircraft sun visor. The extension when so supported may be longitudinally adjusted to project a desired position therefrom to block out adjustable sun rays. The extension is substantially the same length as the sun visor on which it is to be mounted, and by a slight modification may be used on a sun visor having pivotal supports at each end thereof. In use in an automobile the sheet material will preferably be opaque, but in an aircraft the material may be transparent Mylar or like material that is colored smoke gray, green or the like that tend to minimize the passage of sun rays therethrough, and has a filtering effect on such rays.

BRIEF DESCRIPTION OF THE DRAWINGS

FIG. 1 is a perspective view of a first form of the opaque extension mounted on an automotive sun visor, and being longitudinally adjustable relative to the latter;

FIG. 2 is a side elevational view of the extension that is not only longitudinall adjustable on the sun visor on which it is mounted, but is transversely adjustable to conform to the width of the sun visor;

FIG. 3 is a transverse cross-sectional view of the sun visor extension taken on the line 3—3 of FIG. 2;

FIG. 4 is a perspective view of a second form of the sun visor extension that is adapted to be removably mounted on a sun visor of the type that is pivotally supported from both first and second ends thereof;

FIG. 5 is a side elevational view of the second form of the sun visor extension; and FIG. 6 is a transverse cross-sectional view of the second form of sun visor extension taken on the line 6—6 of FIG. 5.

DESCRIPTION OF THE PREFERRED EMBODIMENT

The first form A of the sun visor extension as shown in FIG. 1 and the second form B illustrated in FIG. 4 are both preferably formed from a stiff bendable sheet 10. Sheet 10 is preferably of a single ply non-woven stock composed of cotton fibers in combination with latex. Sheet material 10 of this type is distributed under the trade notation "Pajo-lexide" in a variety of decorative finishes by Gane Brothers and Lane Inc., Elk Grove Village, Ill. When it is desired to have the extension transparent as when used on an aircraft visor, the sheet material may be transparent Mylar or like material that is colored smoke gray, green or the like to filter out the portions of the sun's rays that are most irritating to the eyes.

The sheet 10 in the first form A of the extension is adapted to be movably mounted on an automotive or aircraft sun visor that is generally rectangular in shape and is supported from a first end 12 by a pivotal connection 14 that is secured to a portion of an automotive vehicle D adjacent an upper corner portion of a wind shield E.

The sheet 10 has upper and lower parallel fold lines 14 and 16 formed therein that subdivide the sheet into a forward panel 18, a first rearwardly disposed, downwardly extending flap 20, and an upwardly extending rearwardly disposed flap 22. The first flap 20 is of sufficient width as to overlie the upwardly extending flap 22. A second downwardly extending flap 24 is secured by rivets 26 or other conventional fastening means to the upper forward surface of the first flap 20. The first and second flaps 20 and 24 have free lower edges 20a and 24a that lie in substantially the same horizontal plane.

The first and second flaps 20 and 24 adjacent the lower edges 20a and 24 have a number of longitudinally spaced fasteners E mounted thereon. Each fastener E is preferably of the snap type and includes a first recessed fastener portion 28 mounted on the first flap 20 that removably engages a rearwardly extending second fastener portion 30 that includes a shank 30a.

First and second flaps 20 and 24 define an upwardly extending space 32 therebetween into which the flap 22 may be extended as shown in FIG. 3. The upwardly extending flap 22 has a number of sets of spaced axially aligned openings 34 therein, with each set vertically aligned with one of the fasteners E. The shank 30a of each fastener E may be selectively extended through one of the openings 34 to removably engage a first portion 28 of the fastener.

By selecting the appropriate openings 34 for engagement by the shanks 30a of the fasteners E, the width of the extension A between folding lines 14 and 16 may be varied to conform to the width of the particular sun visor C on which it will be used. The extension A when so adjusted to width is adapted to snugly and slidably engage a particular sun visor C as shown in FIG. 1, and may be longitudinally adjusted thereon to project from the sun visor a desired distance. When the extension C is in the locked and adjusted position as shown in FIG. 3 it is in the form of a flat sleeve that defines an elongate longitudinal space 36 that is engaged by the sun visor C.

The second form B of the extension is shown in FIGS. 4 to 6 that may be formed from the same sheet material as the first form A. The second form B has first and second spaced parallel folded lines 40 and 42 formed in the sheet 10 that subdivide the latter into a rectangular forward panel 44 and rearwardly disposed flaps 46 and 48 that overlap one another as shown in FIG. 6. The overlapping portions of the flaps 46 and 48 have removably fastening means 50 associated therewith, which means is preferably a pressure sensitive adhesive area. When the flaps 46 and 48 are removably locked together the second form B of the extension is in the form of a flat sleeve that has a space 52 extending longitudinally therethrough that is snugly and slidably engaged by the sun visor C. In the event the sun visor C is of the type that is supported by a second connector 14a as shown in FIG. 4, an opening 54 extends downwardly from first folding line 40 in sheet 10, and through which the connector 14a extends to engage a second portion of the connector 14b secured to an end portion of the sun visor C. The second form B of the invention operates in the same manner as the first form A, and is particularly adapted for use on sun visors C having dual supports. The fastening means 50 is not limited to pressure sensitive adhesive but may be glue, double face tape, sewing, riveting, stapling, snaps or the like.

In the event the person using the invention is of short stature the dimensions of the extension may be enlarged to permit it to be adjusted downwardly on the supporting visor, and will then serve the same function as the invention provides for persons of normal height.

The use and operation of the invention has been explained previously in detail and need not be repeated.

What is claimed is:

1. An elongate laterally adjustable, light diminishing extension capable of being slidably mounted for longitudinal adjustment on sun visors of different widths that are mounted on an automotive or aircraft vehicle, said sun visor being generally rectangular in space, and said extension including:
   a. a single rectangular sheet of a bendable light diminishing material that has first and second spaced parallel fold lines therein that subdivide said sheet into a forward panel, a rearwardly disposed downwardly extending first flap of sufficient width as to overlie said upwardly extending flap said material being of a type that removes at least a portion of the sun rays directed thereon;
   b. a second downwardly extending flap secured to said forward surface of said first flap, said first and second flaps defining a space therebetween in which an upwardly disposed portion of said upwardly extending flap is adjustably and removably disposed; and
   c. fastening means that include an engageable member on said first flap and an engaging member on said second flap, and a plurality of aligned spaced openings in said upwardly extending flap, with any desired one of said openings capable of being positively engaged by said engageable and engaging members to vary the distance of said second folding line relative to said first folding line to the extent that said sleeve will slidably and frictionally engage a sun visor of a particular width.

2. An extension as defined in claim 1 in which said sun visor is pivotally supported by first and second spaced connectors from said vehicle, said second connector being separable into two portions, and said rectangular sheet having an opening therein that extends through said first fold line, with said extension capable of being slidably mounted on said sun visor when said two portions are separated, and said extension being held in a fixed position on said sun visor when said first and second portions are brought together and extend through said opening.

* * * * *